Sept. 3, 1929.   T. F. BAILY   1,727,193
PROCESS OF MAKING FERRO SILICON
Filed July 19, 1927
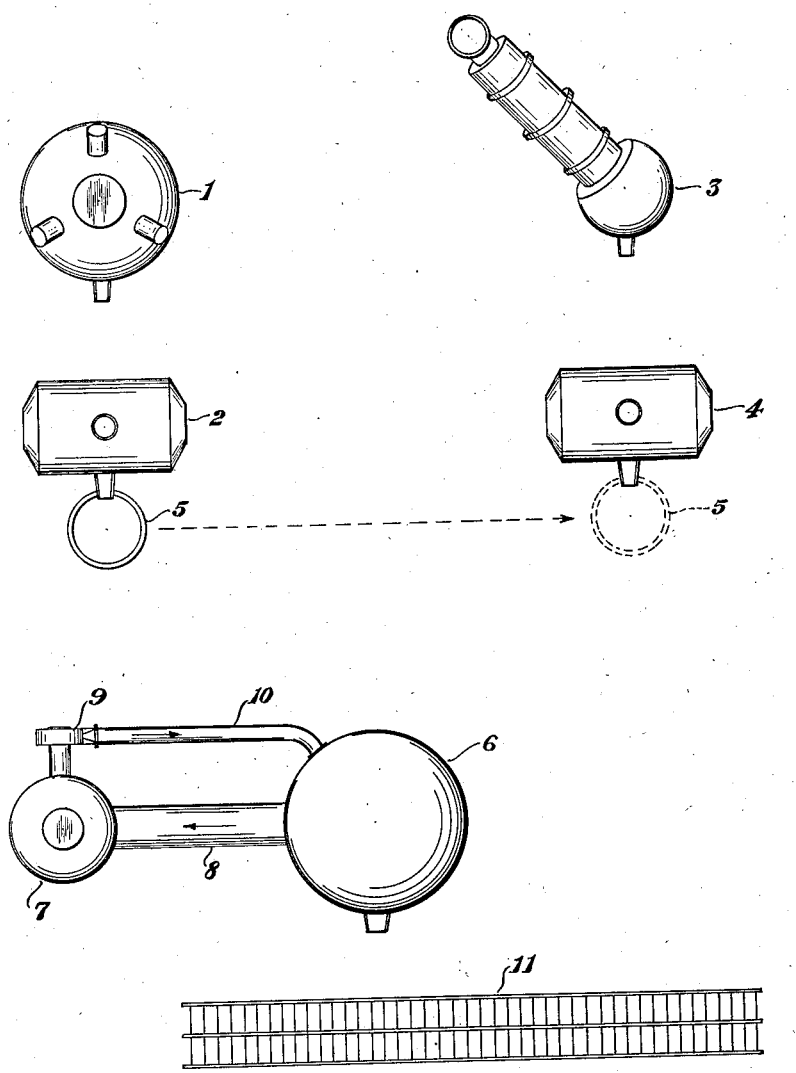
Inventor
T. F. Baily
By Frease and Bond   Attorneys Patented Sept. 3, 1929.

1,727,193

UNITED STATES PATENT OFFICE.

THADDEUS F. BAILY, OF ALLIANCE, OHIO.

PROCESS OF MAKING FERROSILICON.

Application filed July 19, 1927. Serial No. 206,863.

The invention relates to the manufacture of ferrous alloys and more particularly to a process for making ferro-silicon or high silicon pig iron and producing graphite as a by-product.

The object of the improvement is to provide a process for producing ferro-silicon wherein $SiO_2$ is melted and reduced in the presence of carbon, to produce silicon; scrap iron or iron oxide being melted in a separate furnace, in the presence of carbon; the molten silicon and iron being mixed in proper proportions to produce ferro-silicon or high silicon pig iron of any desired percentage; it being possible to produce graphite as a by-product of the operation by superheating the iron in the presence of the carbon, causing the iron to pick up a surplus amount of carbon which is thrown out from the bath, when mixed with the silicon, in the form of flake graphite.

Apparatus for carrying out the improved process is illustrated diagrammatically in the accompanying drawing.

Similar numerals refer to similar parts throughout the drawing.

In carrying out the process, scrap iron or iron oxide may be melted in the presence of carbon in a furnace illustrated diagrammatically at 1, which may be of the same construction as illustrated in my co-pending application for shaft type electric furnaces executed of even date with the present application.

The molten iron is withdrawn from the furnace 1 and placed in a mixer indicated generally at 2 in which the iron is maintained in a molten condition and at the desired temperature.

$SiO_2$ and carbon, in proper proportions, are heated, and molten silicon produced in a furnace indicated generally at 3 which may be of the type illustrated and described in my co-pending application for method of reducing oxides executed of even date with the present application.

Molten silicon is produced in the furnace 3 and withdrawn therefrom to be retained at the desired temperature, in a molten condition, in the mixer shown diagrammatically at 4.

When it is desired to alloy the metal, a known quantity of the molten iron is poured from the mixer 2 into a ladle, as indicated at 5, and charged into the separator 6. The desired amount of molten silicon is then poured from the mixer 4 into the ladle 5 and also charged into the separator 6.

Where it is desired to produce graphite as a by-product of the operation, the furnace 1 will be run at a higher temperature, superheating the molten iron and causing the same to absorb a surplus amount of carbon.

As the molten carbon-laden iron is mixed with the silicon in the separator, the presence of silicon will cause the surplus carbon to be quickly thrown out of the bath in the form of flake graphite.

This graphite may be withdrawn from the separator to a collector 7, through a suction pipe 8. A fan 9 communicates with the collector and with the pipe 10 leading to the separator, whereby an inert gas may be continuously circulated between the separator and collector for the purpose of withdrawing the flake graphite from the separator, as it is thrown out of the bath, and carrying it to the collector where it settles and may be withdrawn from time to time.

When the molten ferro-silicon has thrown off its surplus carbon in the separator, the metal may be poured from the separator into a pig casting machine or the like illustrated at 11, producing pigs of ferro-silicon of the desired silicon content.

One of the advantages of this process is that the charge for both the silicon reduction furnace and the iron melting furnace is always of the same proportion and that any analysis of ferro-silicon can be produced by the blend without change in the character of the charge to the furnace.

For instance, when making 11% ferro-silicon, the melting rate of silicon per hour would be constant in both furnaces, the silicon furnace producing substantially one-tenth as much silicon as the iron melting furnace produces iron. When it is desired to make 50% ferro-silicon, for instance, then both furnaces can be maintained at the relative productions mentioned and the excess iron cast into separate molds as pig iron.

In this way, the silicon furnace may be run at a definite capacity, irrespective of the silicon content of the final product, it being much simpler to control the production and analysis of ferro-silicon by blending the iron and the silicon in the ladle rather than attempting to produce the desired silicon content in the product by charging all materials for the final product in the reduction furnace, as it is well known that it is much more difficult to control the analysis from a reduction operation than it is from an operation where the constituent materials of an alloy are mixed in their pure state.

In blending this way another advantage to be obtained is that when it is desired to produce iron with a lower carbon content than 4% and containing a small percent of silicon as well, such as the analysis required in malleable iron, by this process a high carbon content iron may be run from the iron melting furnace and then by the introduction of silicon to 2½%, for illustration, the carbon content will be brought down to the desired analysis in the pig, the excess carbon being thrown out of the bath in the separator before casting, in the form of flake graphite, automatically producing iron of the desired silicon and carbon content and recovering all the excess carbon thrown out.

Another advantage that may be obtained is that when melting an iron charge running higher in impurities than that desired in the ferro-silicon, the iron alone may be refined in the iron mixer after melting and before being run into the separator, making a simple refining operation for impurities such as sulphur and phosphorus, while if the same iron materials were charged into the reduction furnace with the silica, the refining operation would be more difficult and almost surely attended by an excessive loss of silicon.

I claim:

1. The process for the manufacture of ferro-silicon which consists in reducing $SiO_2$ in the presence of carbon producing molten silicon, separately melting iron in the presence of carbon and mixing known proportions of the molten silicon and iron to produce ferro-silicon of predetermined composition.

2. The process in the manufacture of ferro-silicon and graphite which consists in reducing $SiO_2$ producing molten silicon, separately melting and superheating iron in the presence of carbon and mixing known proportions of the iron and silicon to produce ferro-silicon or silicon pig iron of predetermined composition and collecting the carbon thrown out of the bath in the form of graphite.

3. The process in the manufacture of ferro-silicon and graphite which consists in reducing $SiO_2$ producing molten silicon, separately melting iron in the presence of carbon and mixing known proportions of the iron and silicon to produce ferro-silicon or silicon pig iron of predetermined composition and collecting the carbon thrown out of the bath in the form of graphite.

4. The process for the manufacture of ferro-silicon and graphite by-product which consists in melting iron in the presence of carbon, and mixing molten silicon with the molten iron, causing a portion of the carbon to be thrown out of the bath in the form of graphite and collecting the graphite.

5. The process in the manufacture of ferro-silicon which consists in reducing $SiO_2$ in the presence of carbon producing molten silicon, and separately melting iron in the presence of carbon, refining the iron and then mixing known proportions of the molten silicon and iron.

6. The process in the manufacture of ferro-silicon which consists in reducing $SiO_2$ producing molten silicon, and separately melting iron in the presence of carbon, refining the iron, then mixing known proportions of the molten silicon and iron and collecting the excess carbon thrown out of the bath in the form of graphite.

7. The process in the manufacture of ferro-silicon which consists in reducing $SiO_2$ producing molten silicon, and separately melting iron in the presence of carbon, refining the iron, then mixing known proportions of the molten silicon and iron and cooling the mixture to throw the excess carbon out of the bath in the form of graphite, and collecting the graphite.

In testimony that I claim the above, I have hereunto subscribed my name.

THADDEUS F. BAILY.